Aug. 20, 1957     C. M. COOPER     2,803,601
REACTOR UNLOADING MEANS

Filed Oct. 16, 1945     3 Sheets-Sheet 1

Witnesses:
Herbert E. Metcalf
Estill E. Ezell

Inventor:
Charles M. Cooper
By:
Attorney.

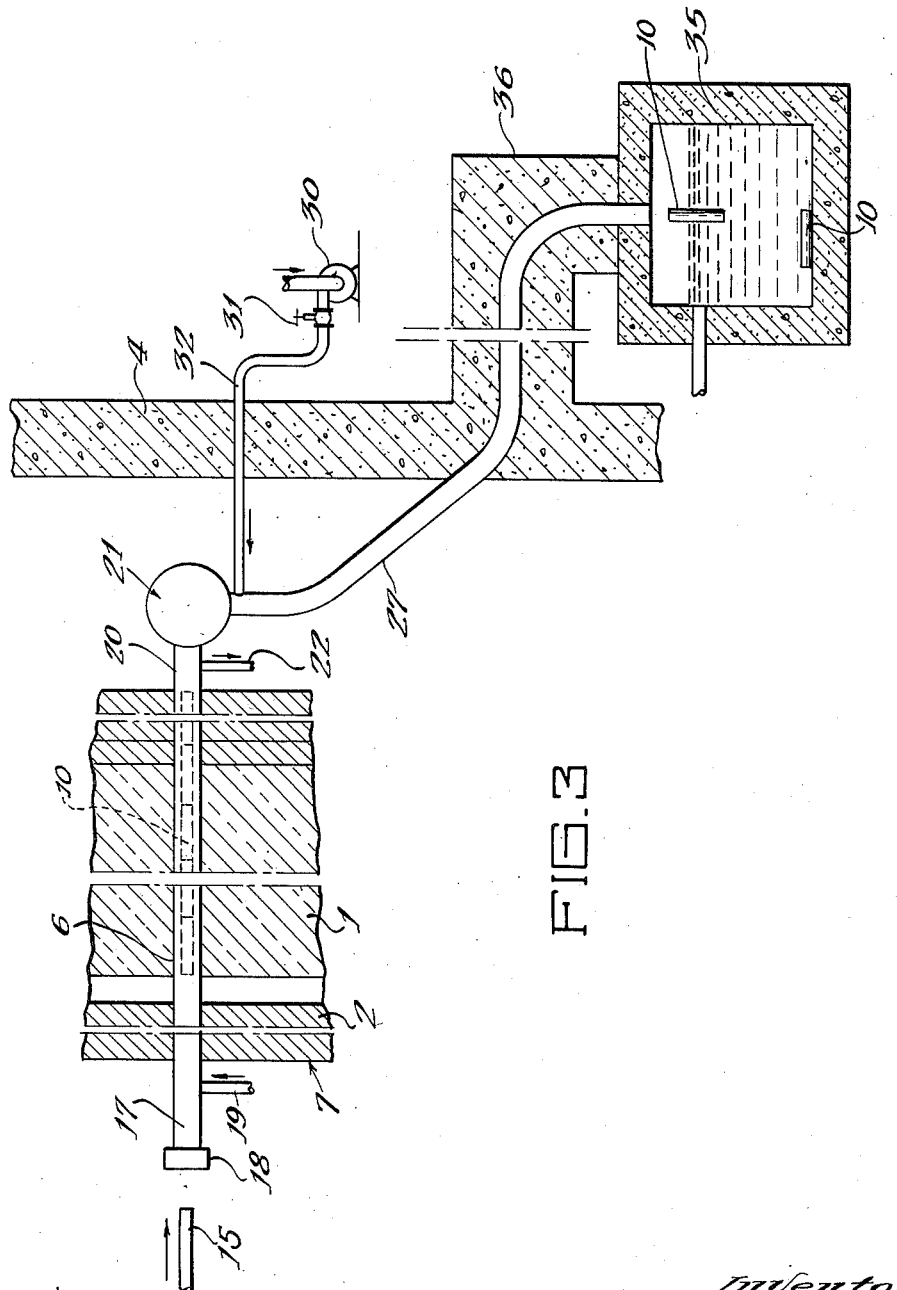

Aug. 20, 1957  C. M. COOPER  2,803,601
REACTOR UNLOADING MEANS
Filed Oct. 16, 1945  3 Sheets-Sheet 3
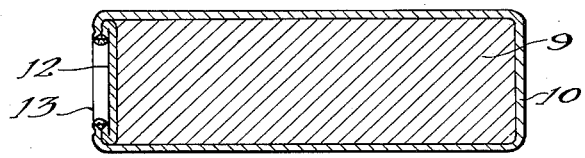
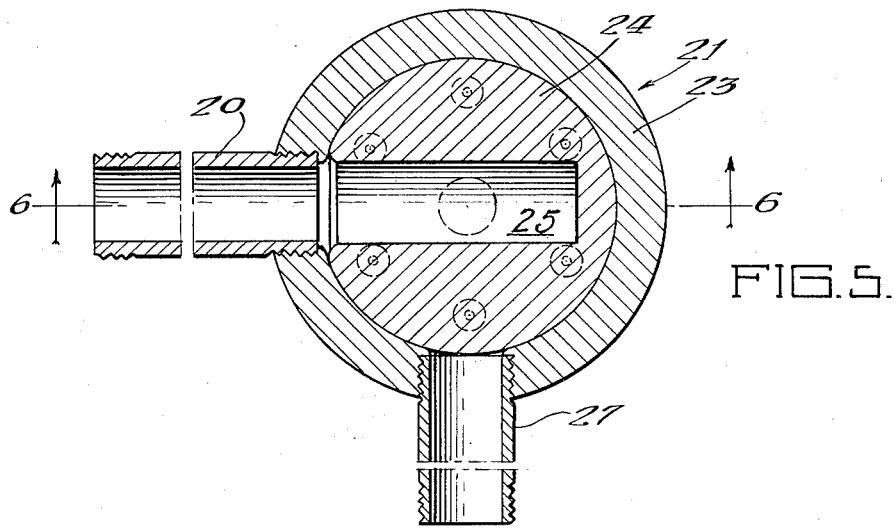
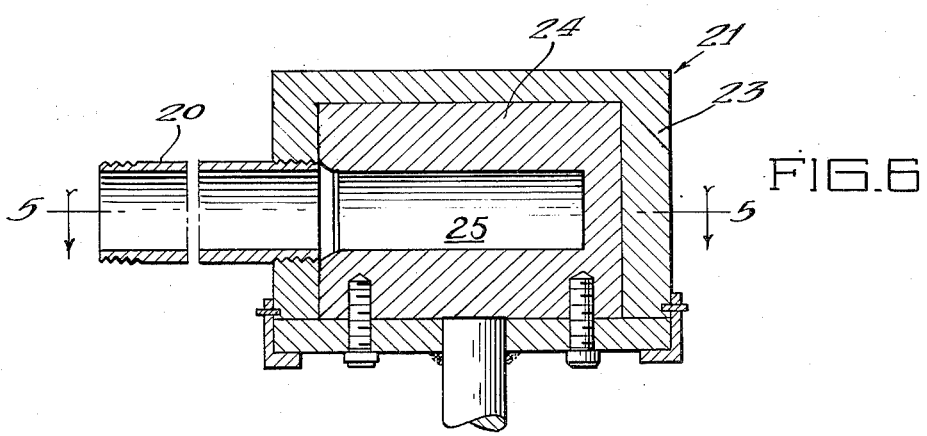
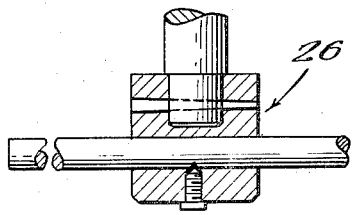
Witnesses:
Herbert E. Metcalf
Estill E. Ezell
Inventor:
Charles M. Cooper
By: Robert A. Sanmeder
Attorney.

United States Patent Office 2,803,601
Patented Aug. 20, 1957

2,803,601

REACTOR UNLOADING MEANS

Charles M. Cooper, Newark, Del., assignor to the United States of America as represented by the United States Atomic Energy Commission Application October 16, 1945, Serial No. 622,633

1 Claim. (Cl. 204—193.2)

The present invention relates generally to a means and method of safely handling radioactive material, and particularly to a means and method of transporting highly radioactive material, such as uranium, after it has been irradiated with neutrons in high density, such as exists in neutronic reactors.

It is known that a self-sustaining chain reaction can be obtained in devices known as neutronic reactors utilizing natural uranium as a result of slow neutron fission of the $U^{235}$ content of the natural uranium and that such self-sustaining chain reaction may be used to produce power, as has been fully described and claimed in the Fermi and Szilard application, Serial Number 568,904, filed December 19, 1944, now Patent No. 2,708,656, dated May 17, 1955. In such reactors, discrete bodies of natural uranium of high purity are disposed, usually in the form of a lattice arrangement of spheres or rods, in a neutron moderator such as graphite, beryllium or heavy water of high purity, surrounded by a neutron reflector. Neutron absorption in the $U^{238}$ content of the natural uranium during the reaction leads to the production of the transuranic isotope $94^{239}$ of element 94, known as plutonium (symbol Pu), which isotope is fissionable in much the same manner as $U^{235}$. $94^{239}$ is formed in neutronic reactors utilizing natural uranium in accordance with the following process:

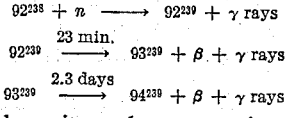

$94^{239}$ in high purity and concentration is recoverable from the uranium in the reactors after operation by chemical processes. In neutronic reactors operating at elevated powers such as, for example, 5,000 to 250,000 kilowatts, a large amount of heat is generated in the uranium bodies. Therefore the uranium bodies in the reactor are cooled by passage of a coolant in heat exchange relation therewith. Furthermore, in order to recover the $94^{239}$ produced in the reactor the uranium is customarily removed at intervals for chemical processing. Fission of the $U^{235}$ existing in the uranium bodies creates large quantities of fission products, defined as including original fission fragments and their daughter decay products. The end result is that the uranium bodies become so radioactive after long irradiation that they cannot be handled for many days without adequate personnel shielding, depending on the time and density of irradiation. In addition, self-absorption of such radioactivity heats the bodies so that some measure of cooling is required long after the irradiation has ceased.

These latter requirements complicate the discharge of uranium bodies from neutronic reactors, and it is an object of the present invention to provide a means and method of transporting highly radioactive bodies, such as uranium bodies irradiated with neutrons in a neutronic reactor, from the reactor, preferably quickly after shutdown, to a remote location where the bodies can safely age until the radioactivity is reduced and the reactor can be quickly reloaded with fresh material, thus shortening materially the shutdown period of the reactor.

It is another object of the present invention to supply adequate cooling for the uranium bodies at all times during transport from the reactor to the aging location.

The present invention will be described as used in conjunction with a neutronic reactor wherein uranium bodies in the form of short cylindrical slugs are disposed in rod geometry in coolant tubes running through the reactor. The details of such a reactor are disclosed and claimed in the co-pending application above cited. For this reason the neutronic reactor will only be diagrammatically represented in the drawings appended hereto, as follows:

Fig. 3 is a fragmentary enlarged diagrammatic elevational view, partly in section, showing a slug transport and cooling system embodying the present invention;

Fig. 4 is a longitudinal sectional view of a uranium slug to be transported;

Fig. 5 is a vertical sectional view of a slug handling valve, as indicated by the line 5—5 shown in Figure 6; and Fig. 6 is a horizontal sectional view taken as indicated by the line 6—6 in Fig. 5.

Figure 1:
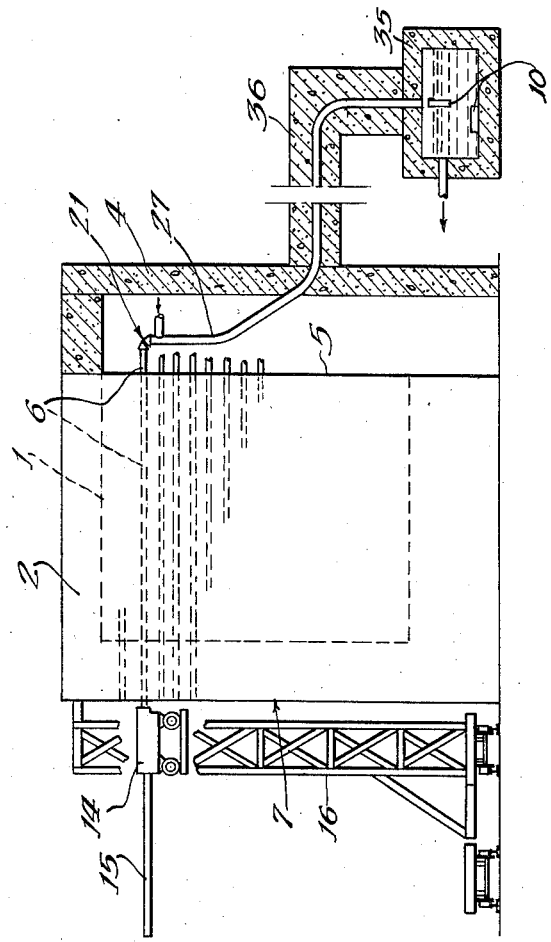
Fig. 1 is a diagrammatic elevational view, partly in section, of a water cooled neutronic reaction embodying the present invention.

Referring first to Fig. 1 showing the gross assembly of a neutronic reactor embodying the present invention, the neutronic reactor system comprises a mass or block of neutron moderator such as graphite of substantially cubical shape, indicated by the dotted line 1. The moderator block 1 is closely surrounded on all but one side by a radiation shield 2 of concrete, for example, 5 to 10 feet thick. The remaining side has a radiation shielding wall 4 spaced from the open face 5 of the moderator block. A plurality of coolant tubes 6 extend in parallel relationship through the reactor from a charging face 7 outside of the shield 2 to the open face 5 inside wall 4.

Figure 2:
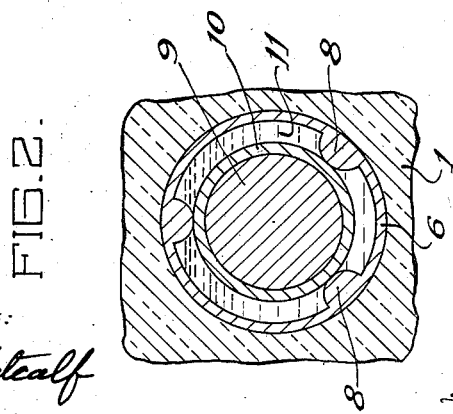
Fig. 2 is a transverse cross sectional view of a typical coolant tube with a uranium slug therein.

The coolant tubes 6 are shown in more detail in Figs. 2 and 3. The tubes 6 are inserted in the graphite moderator and have a number of internal ridges 8 supporting and spacing from the tube walls a plurality of uranium bodies 9 covered with a sealed aluminum jacket 10 to prevent the coolant flowing in annulus 11 from corroding the uranium bodies 9. A single jacketed uranium body is customarily called a slug and the slugs are inserted in end to end relationship in the tubes to effectively form rods extending through the moderator block 1. In a typical neutronic reactor of this type, the slugs are 1.1 inches in diameter and 4 inches long.

One way in which the slugs are sealed is shown in Fig. 4. The jacket 10 is either forced over or bonded to the uranium body 9 with the open end projecting. A cup-shaped cap 12 is placed over the exposed end of the body 9 and the registering edges of jacket and cup welded as shown at 13. The projecting portions are then spun over inwardly to flatten the end. Slugs are pushed into the open ends of tubes 6 of the reactor at the charging face 7 by a charging machine 14 embodying a plunger 15 movable into the tubes 6 as shown in Fig. 1. The charging machine 14 is positioned on an elevator structure 16 movable on tracks along the charging face 7 so that any tube can be charged with slugs.

Charging ends 17 of the tubes 6 extend through the charging face 7, which, after the tube is charged with slugs, are provided with caps 18 as shown in Fig. 3. Water is supplied through inlet 19 in each tube 6; the water passes through the tubes 6 and over the slugs to cool them.

At the outlet ends 20 of the tubes 6, a special slug valve 21 is provided, normally closing the outlet end of each tube, and a water outlet 22 is provided for each tube between valve 21 and the moderator block. Coolant inlets 19 and outlets 22 are connected to manifolds (not shown), and water is circulated under pressure through the tubes 6 during operation of the reactor.

After operation, for example, for 50 days at 100,000 kilowatts, it may be desirable to discharge all or part of the uranium in order that the $94^{239}$ formed can be recovered. However, the radioactivity of the slugs is very high, so high in fact that cooling cannot be entirely discontinued because of the self-heating of the uranium slugs due to the absorption of their own radioactivity. The present invention provides a means and method of simultaneously cooling and transporting the irradiated slugs to a remote location where they can safely age prior to chemical treatment. Due to the fact that the slugs are both cooled and shielded during transport, the reactor can be unloaded substantially immediately after shutdown of the chain reaction.

The reactor is first shut down and the lapse of a few minutes is allowed for the emission of delayed neutrons from the fissions. Water circulation through tubes 6 can then be reduced to 10 or 25 percent of its full operating value, according to the power existing before shutdown. One tube 6 is then opened at the charging face 7 by removal of cap 18. Water circulation is continued in the open tube, some of the water spilling out of the open end of the tube 6 until plunger 15 is inserted. This plunger does not have to prevent all water leakage at the open end of the tube, but merely serves to block the open end sufficiently to cause water to continue flowing through the tube 6 to the discharge end.

Slug valve 21 is constructed to receive a single slug, as shown in Figs. 5 and 6. A valve casing 23 is provided in which the discharge end 20 of a tube 6 terminates. Inside the casing is a rotatable plug 24 having a slug recess 25 therein into which a single slug can be pushed by plunger pressure on the opposite end of the string of slugs. The plug 24 is then turned 90° by a remotely operated handle 26 to drop the slug by gravity into a hydraulic conveying tube 27 entering the casing as shown in Figs. 3 and 5.

As soon as the slug enters conveying tube 27, water under pressure is placed behind the slug from pump 30 under control of pressure valve 31 through tube 32 passing through shielding wall 4. This water pressure pushes the slug through the tube 27 to discharge the slug along with the water into a remote aging tank 35. Tube 27 is provided with lead or concrete shielding 36, for example, and can be up to 500 feet long without excessive pumping pressures being required. In this manner, all of the slugs in any tube in the reactor can be conveyed to the aging tank 35 shortly after shutdown and without the necessity of approach by any operating personnel. The emptied tube 6 can then be reloaded with fresh slugs as desired. The unloading of other tubes 6 can then be accomplished as desired, in the same manner.

In a slug transport system of the type described, 100 feet long, 1.38 I. D. seamless steel tubing has been used (for 1.1 in. diameter slugs) with up to a 10 foot rise in the line and with minimum radius of bends of about 2 feet. No excessive wear of the aluminum jackets has been observed.

Velocities and pressure drops through the system were as follows:

| Water Velocity (Ft./sec.) | Slug Velocity (Ft./sec.) | Pressure Drop (Average) (Lb./Sq. in.) |
| --- | --- | --- |
| 8.5 | 5.8 | 8 |
| 11.1 | 7.3 | 12.5 |
| 14.8 | 10.4 | 18.5 |
| 17.6 | 12.6 | 23.0 |
| 21.0 | 15.7 | 32.5 |
| 24.4 | 18.2 | 41.0 |

A minimum water velocity of 8 feet per second was required for conveying one slug.

It will be noted from the above that the water velocity is consistently greater than the slug velocity. This "leakage" around the slug is deliberately introduced, in that it provides a water flow around the slug sufficient to cool it while being transported, without possibility of boiling taking place in the conveying fluid, thereby eliminating vapor lock.

On arrival at the aging tank 35, the slugs are discharged into water, and boiling in that tank prevents slug temperatures from rising over 100° C. If boiling is excessive, cool water can be circulated through the tank.

The system as described is fully operable to transport radioactive slugs 500 feet or more as desired, with complete and effective cooling while en route.

Several points should be noted. The slug valve 21 serves at all times to prevent the higher water pressure in the conveyor tube 27 from reaching the coolant tube being discharged, and further serves to feed the slugs into the conveyor tube one at a time. However, two or more slugs can be sequentially discharged into the conveyor tube 27 and then moved as a train, if desired. The water pump 30 can be placed outside the reactor shielding and is therefore readily available for servicing.

While the present invention has been shown as utilizing a slug valve and conveyor tube for each coolant tube, in reactors having a large number of tubes, a single slug valve can be used and applied to the discharge ends of the tube to be unloaded, with the first portion of the conveyor tube and the water supply tube being flexible to permit the use of the same slug valve on a number of tubes. In either case, however, the action of the system is identical.

While the present invention has been described as particularly useful in transporting radioactive bodies from a neutronic reactor to an aging tank, it is equally useful in transporting materials made radioactive in any manner, as, for example, by irradiation with particles accelerated in a cyclotron or similar device.

What is claimed is:

In combination, a neutronic reactor having a coolant tube extending therethrough, uranium containing bodies in said tube sized to provide a coolant channel therearound, a coolant inlet and outlet at respective ends of said tube to direct a liquid coolant through said tube and around said bodies, a valve closing one end of said coolant tube and having a member provided with a recess to receive a uranium containing body when in one position, said member being rotatable to drop a received body under the influence of gravity, a means for pushing a body into said recess, a conveyor tube positioned to receive a body when said valve is rotated, means for applying a liquid under pressure to a body in said conveyor tube away from said valve for discharge at a remote location, said body being a loose fit in said conveyor tube to provide a substantial liquid flow around said body during passage along said conveyor tube.

References Cited in the file of this patent

UNITED STATES PATENTS

| | | |
|---|---|---|
| 1,133,503 | Ralston | Mar. 30, 1915 |
| 1,975,162 | Layne | Oct. 2, 1934 |
| 2,078,235 | Chapman | Apr. 27, 1937 |
| 2,087,391 | Toulmin | July 20, 1937 |
| 2,127,193 | Toulmin | Aug. 16, 1938 |
| 2,165,397 | Mason et al. | July 11, 1939 |
| 2,229,610 | Nicholoy | Jan. 21, 1941 |
| 2,396,305 | Toft | Mar. 12, 1946 |
| 2,708,656 | Fermi et al. | May 17, 1955 |

FOREIGN PATENTS

| | | |
|---|---|---|
| 114,150 | Australia | May 2, 1940 |
| 233,011 | Switzerland | Oct. 2, 1944 |

OTHER REFERENCES

Smyth: "Atomic Energy for Military Purposes," pages 103, 104, August 1945. Copy may be purchased from Supt. of Documents, Washington 25, D. C.